United States Patent
Cardona

(10) Patent No.: US 10,264,112 B2
(45) Date of Patent: Apr. 16, 2019

(54) VOICE COMMUNICATION AND LOCATION TRACKING SYSTEM

(71) Applicant: Muchi Corporation, San Francisco, CA (US)

(72) Inventor: Javier Cardona, San Francisco, CA (US)

(73) Assignee: MUCHI CORPORATION, San Francisco, CA (US)

(*) Notice: Subject to any disclaimer, the term of this patent is extended or adjusted under 35 U.S.C. 154(b) by 0 days.

(21) Appl. No.: 15/294,645

(22) Filed: Oct. 14, 2016

(65) Prior Publication Data

US 2017/0111510 A1   Apr. 20, 2017

Related U.S. Application Data

(60) Provisional application No. 62/242,949, filed on Oct. 16, 2015.

(51) Int. Cl.
| | |
|---|---|
| *H04M 3/42* | (2006.01) |
| *H04W 4/02* | (2018.01) |
| *H04W 4/70* | (2018.01) |
| *H04M 1/725* | (2006.01) |
| *H04M 3/533* | (2006.01) |
| *H04W 64/00* | (2009.01) |

(52) U.S. Cl.
CPC ..... *H04M 1/7255* (2013.01); *H04M 3/42348* (2013.01); *H04M 3/53333* (2013.01); *H04W 4/02* (2013.01); *H04M 2242/30* (2013.01); *H04W 4/70* (2018.02); *H04W 64/00* (2013.01)

(58) Field of Classification Search
CPC ........... H04M 1/7255; H04M 3/42348; H04M 3/53333; H04M 2242/30; H04W 4/02; H04W 64/00; H04W 4/70
See application file for complete search history.

(56) References Cited

U.S. PATENT DOCUMENTS

| | | | |
|---|---|---|---|
| 6,977,921 B1 * | 12/2005 | Dolan ..................... | H04W 4/12 370/352 |
| 7,197,122 B2 * | 3/2007 | Vuori ................... | H04M 1/7255 379/201.1 |
| 8,189,748 B2 * | 5/2012 | Susama ............... | H04M 1/7255 379/88.17 |

(Continued)

*Primary Examiner* — Brandon J Miller
(74) *Attorney, Agent, or Firm* — Womble Bond Dickinson (US) LLP

(57) ABSTRACT

A special-purpose mobile communication device using low-bandwidth cellular technology designed for IoT applications, such Narrowband LTE for IoT, is used to securely exchange voice messages in real-time or near real-time with another user. The voice messages are short duration voice messages, also referred to as voice clips, that are capable of being compressed using file compression algorithms instead of stream compression methods ordinarily used for real-time audio. A general-purpose mobile communication device activates the special-purpose devices and creates a private network for securely exchanging the voice messages between the devices. The general-purpose device also operates a mobile application that interfaces with a cloud-based mobile voice communication and location tracking system to manage the voice messages and track the location of the special-purpose device using Observed Time Difference of Arrival measurements.

12 Claims, 19 Drawing Sheets

(56) References Cited

U.S. PATENT DOCUMENTS

| | | | | |
|---|---|---|---|---|
| 2002/0058501 A1* | 5/2002 | Hannu | ............... | H03M 7/3088 |
| | | | | 455/432.2 |
| 2014/0006016 A1* | 1/2014 | Qi | ............................ | G10L 19/24 |
| | | | | 704/201 |
| 2015/0288821 A1* | 10/2015 | Seth | ..................... | H04M 1/7255 |
| | | | | 379/88.11 |
| 2016/0112434 A1* | 4/2016 | Chung | ..................... | H04W 4/70 |
| | | | | 726/4 |

* cited by examiner

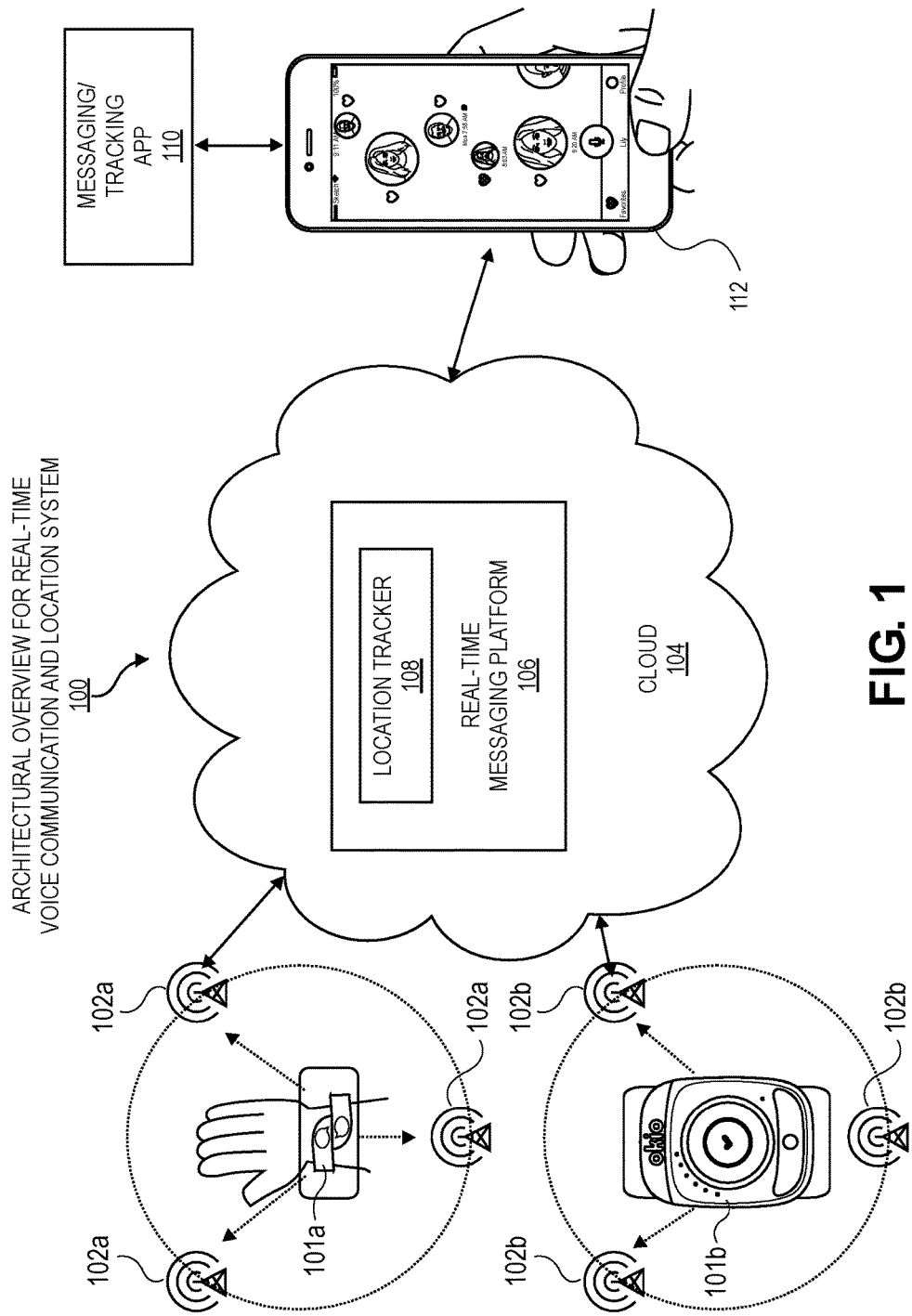

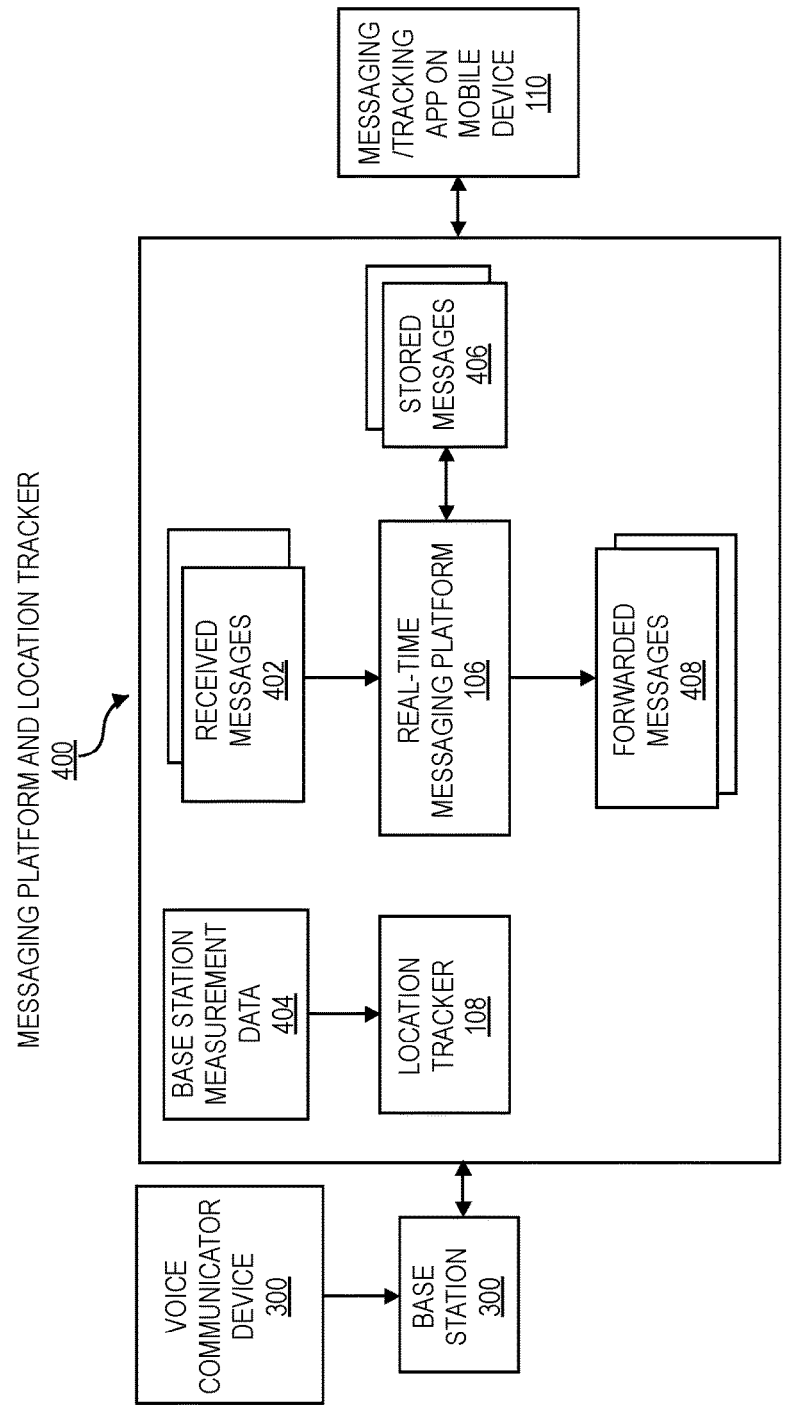

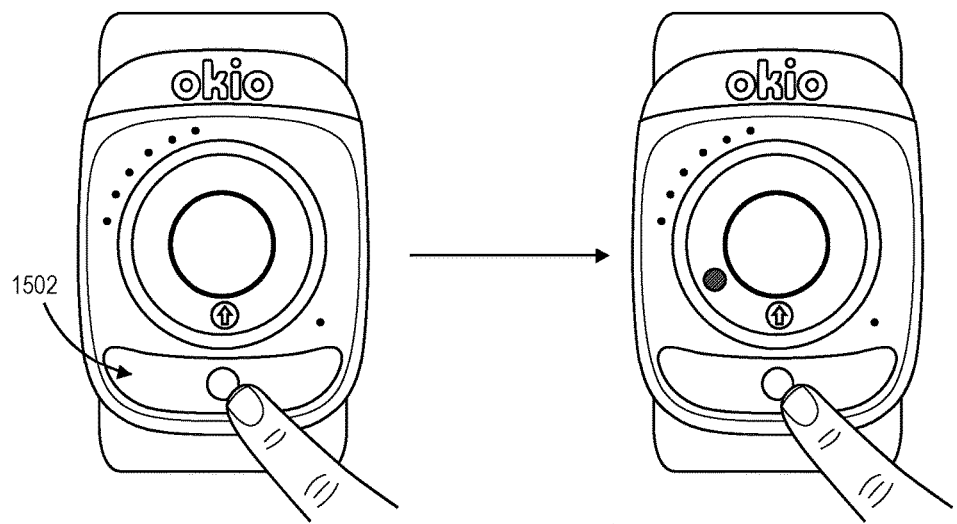
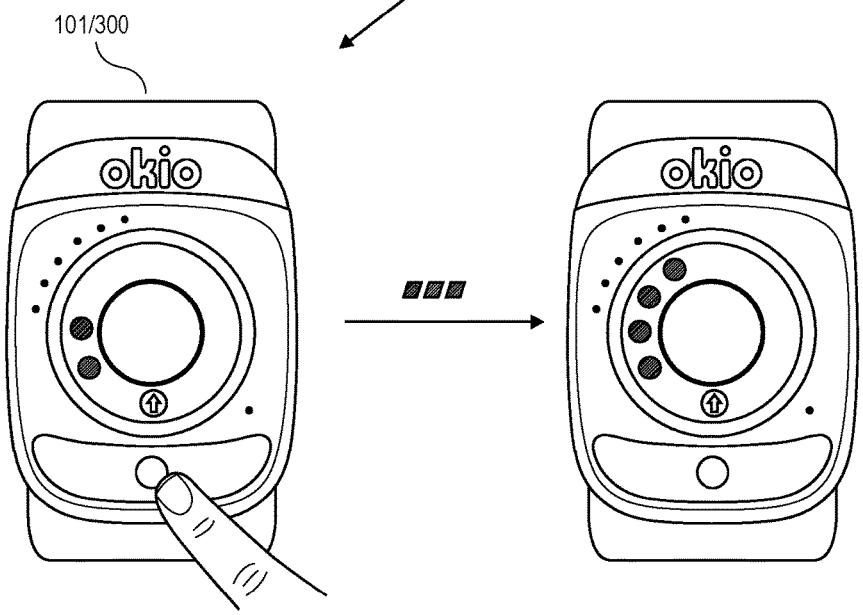

VOICE COMMUNICATION AND LOCATION TRACKING SYSTEM

CROSS-REFERENCE TO RELATED APPLICATIONS

This application claims the benefit of the earlier filing date of Provisional Application Ser. No. 62/242,949, filed on Oct. 16, 2015, entitled Communication System with Voice Chat and Location Information.

TECHNICAL FIELD

The technical field is generally related to mobile communication systems, and in particular mobile voice communication systems supporting voice messaging and location tracking.

BACKGROUND

The use of smartphones and other sophisticated communication devices for voice communication is ubiquitous. Nevertheless, for certain populations of mobile communication users, mobile voice communication that is simpler and less expensive to use might be preferable.

Developments in next generation wireless communication technology that support both data and voice communications, such as LTE (Long Term Evolution), have opened up new opportunities to enable such simpler and less expensive mobile communication through a narrowband radio technology standard for the IoT (Internet of Things), such as the IoT over LTE standard, or Narrowband LTE for IoT (https://en.wikipedia.org/wiki/NarrowBand_IOT)

LTE is based on Internet protocol (IP) packet switched data transmitted over wireless broadband data networks as opposed to conventional circuit switched networks, and provides better indoor coverage. Because LTE also improves speed and reduces latency in mobile communications it is well suited for voice communications that were previously only supported in conventional circuit switched networks. For this reason, Narrowband LTE for IoT also enables the development of services to enhance mobile communication in real-time or near real-time. Moreover, Narrowband LTE for IoT consumes less power than conventional voice communication technology, thereby enabling the development of smaller and more efficient mobile communication devices.

SUMMARY

Methods, systems, apparatus, and machine-readable media provide a mobile voice communication and location tracking system for use with a voice communicator device. In one embodiment, the voice communicator device is a special-purpose mobile communication device using low-bandwidth cellular technology designed for IoT applications to transmit voice messages in real-time or near real-time.

In one embodiment, the voice messages are short duration voice messages, also referred to as voice clips, that are capable of being compressed using file compression algorithms instead of stream compression methods ordinarily used for real-time audio. File compression allows for more efficient compression of voice clips than stream compression.

In one embodiment, the voice messages can be as long as 30 seconds in duration, but short or longer voice messages can also be used. In one embodiment, the allowable duration of voice messages depends on the performance requirements for transmitting the voice messages in real-time or near real-time since longer messages take longer to transmit. In one embodiment, the allowable duration of voice messages depends on the memory capacity of the voice communicator device used to record the voice messages as longer messages take greater memory and processing time to store and compress. In one embodiment, 30 second voice messages result in latency of less than 1 second and provide a good user experience.

In one embodiment, the mobile communication and location tracking system manages voice communications in which a user of the special-purpose mobile device exchanges voice messages with a second user.

In one embodiment, the mobile voice communication and location tracking system manages voice communications, including operating a messaging service for managing messages exchanged between users. In one embodiment, the mobile voice communication and location tracking system tracks user locations, including operating and/or accessing a location tracking service for tracking user locations. In one embodiment the messaging and location tracking services are provided as secure Internet cloud-based services accessible via the wireless communication carrier Narrowband LTE for IoT network.

In one embodiment, the second user uses a general-purpose mobile communication device capable of operating a mobile application for managing the mobile voice communication and location tracking system, including activating one or more special-purpose devices and creating a private network for exchanging the voice messages between the second user and the one or more users of the one or more special-purpose devices.

In one embodiment, the second user can use the mobile application to activate a mix of one or more special-purpose devices and another general-purpose communication device when creating the private network for exchanging voice messages.

In one embodiment, the second user can concurrently activate one of the special-purpose devices and create the private voice communication network with a single action, including the action of taking a picture of a QR-code affixed to the special-purpose device.

In one embodiment, the special-purpose and general-purpose mobile communication devices are each capable of recording, sending and receiving the voice messages over a packet switched network operated by a wireless carrier using low-bandwidth cellular technology, such as Narrowband LTE for IoT.

In one embodiment, the special-purpose and general-purpose devices each include an interaction mechanism to cause a voice message to be any one or more of recorded, played, sent and received, the interaction mechanism including any one of an activator or other touch-sensitive control.

In one embodiment, the general-purpose mobile communication device is any one of a cellular telephone, a smart phone, and any computing device capable of recording, sending and receiving the voice messages over a packet switched network operated by a wireless carrier using the low-bandwidth cellular technology, and further capable of operating the mobile application for managing the mobile voice communication and location tracking system, including displaying an interactive graphical user interface to the mobile voice communication and location tracking system.

In one embodiment, the special-purpose mobile communication device is capable of reporting its location to, or otherwise having its location determined by, the mobile voice communication and location tracking system for relaying to the second user. In this manner, in one embodiment the special-purpose mobile communication device functions as a tracking device that is smaller in size, has lower cost and consumes less battery than the existing GPS-based solutions for tracking locations of mobile communication users and their devices.

In one embodiment, user locations are tracked based on two or more Observed Time Difference of Arrival (ODTOA) measurements from multiple base stations of the wireless carrier operating the packet switched network over which messages are exchanged. In one embodiment, the user locations are tracked using an ODTOA service of the wireless communications carrier providing the Narrowband LTE for IoT network.

In one embodiment, the mobile application operating on the general-purpose mobile communication device activates the one or more special-purpose devices by registering and identifying the devices, including tracking a location of users of the one or more devices based on the reported location of devices.

In one embodiment, the mobile application interfaces with any one or more of the messaging and location-tracking services to store and forward voice messages that are recorded, played, sent and received during exchanges between users. In one embodiment, the mobile application interfaces with any one or more of the messaging and location-tracking services to determine the users' respective tracked locations.

In one embodiment, the special-purpose mobile communication device is capable of indicating a status associated with voice messages exchanged with the second user, including any one or more of recorded, sent, received and played status.

In one embodiment, the mobile application displays, in a display interface of the general-purpose communication device, interactive messaging icons representing the users exchanging voice messages, along with the indicated status of any voices messages, including statuses associated with voice messages as they are recorded, played, sent and received during user exchanges.

In one embodiment, the mobile application displays the messaging icons representing the users exchanging voice messages in conjunction with a mapping application to display the tracked locations of the users.

In one embodiment, the mobile application displays the messaging icons representing the users exchanging voice messages in a chronological order based on when voice messages associated with the users were exchanged. In one embodiment the mobile application provides a scrapbook function allowing the user of the general-purpose device in which the mobile application is operating to select, e.g. "like," any one or more voice messages as a favorite voice message. In one embodiment, the scrapbook function identifies favorite voice messages by the messaging icon representing the user, a "like," flag, such as a heart icon, displayed proximate to the messaging icon and a time-stamp associated with the favorite voice message. In one embodiment, the scrapbook function further allows the user to add a caption to the favorite voice message. In one embodiment, the favorite voice messages can be stored in the device and/or the mobile voice communication and location tracking system for subsequent retrieval and playback in a scrapbook memory application on the device, and/or to send or forward to another user, or to otherwise make use of the stored favorite voice message.

In one embodiment, during operation of the mobile application on the general-purposed device, the interactive messaging icons are capable of being selected in connection with an activator or other touch-sensitive control to cause a voice message to be sent to or received from the user represented by the selected icon.

In one embodiment, the packet switched network over which messages are exchanged is a Narrowband LTE for IoT network operated by a wireless broadband carrier network, and the special-purpose and general-purpose mobile communication devices are each equipped with communication interfaces to a narrow-band IoT network such as the Narrowband LTE for IoT network. In one embodiment, the special-purpose device interfaces with the Narrowband LTE for IoT network using an LTE Cat-1, LTE Cat-M1 and LTE Cat-NB1 interface capable of operating in full or half-duplex mode.

Corresponding methods, systems, apparatus, and machine-readable media for mobile communication and location tracking system can be implemented in servers supporting the special-purpose and general-purpose mobile communication devices and wireless broadband communication systems supporting voice communications between such devices.

BRIEF DESCRIPTION OF THE DRAWINGS

The present invention is illustrated by way of example and not limitation in the figures of the accompanying drawings, in which like references indicate similar elements and in which:

FIG. 1 illustrates an overview of an embodiment of a mobile communication and location tracking system for exchanging voice messages and tracking user location in accordance with embodiments of the invention;

FIG. 4 is a block diagram illustrating exemplary components of a messaging platform and location tracker to provide services for exchanging voice messages and tracking user locations in a mobile communication and location tracking system as described in FIG. 1;

FIGS. 15A-15D illustrating a user interacting with an alternative exemplary embodiment of special-purpose mobile communication device for recording and sending a message in accordance with a mobile communication and location tracking system as described in FIG. 1;

DETAILED DESCRIPTION

Figure 2A:
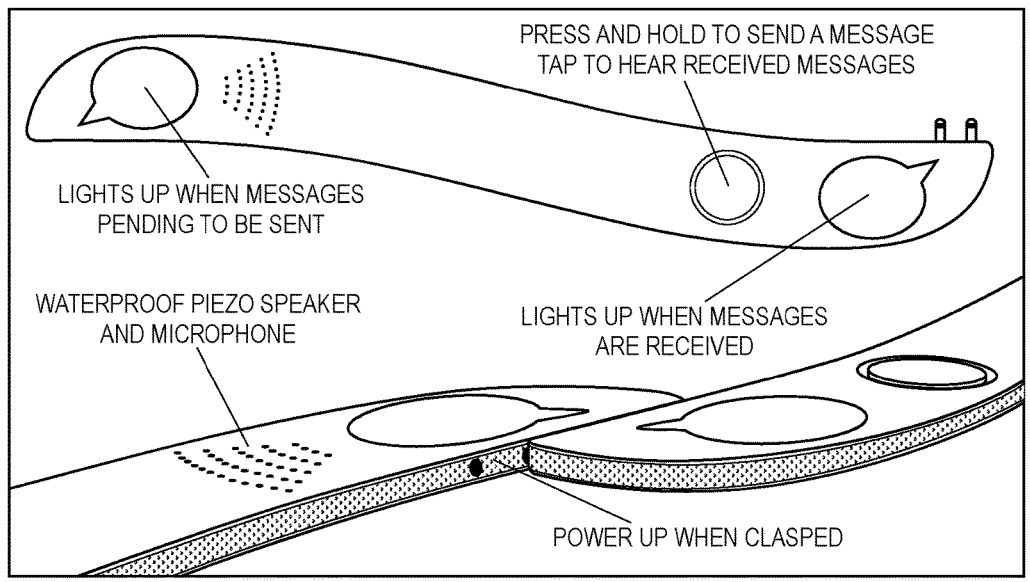
FIGS. 2A-2B illustrate exemplary embodiments of special-purpose mobile communication devices for use with a mobile communication and location tracking system as described in FIG. 1.

As noted earlier, for certain populations of mobile communication users, mobile voice communication that is simpler and less expensive to use is preferable over a conventional mobile telephone or smartphone. Parents, for example, might want to have a simple way to send occasional voice messages to their children as well as track their location yet be reluctant to provide them with devices that have such capabilities, such as a cellular telephone or smartphone.

Conventional cellular telephone or smartphone devices and the like have drawbacks because they can enable anyone to communication with the child and thus raise security issues. Moreover, the ease of access to the Internet, mobile applications and the like can distract a child's attention and interfere with their concentration, and make it possible for them to access inappropriate content. Other health and practical concerns include exposure to radio frequencies, maintenance and loss of the device. As a result of these concerns, it is estimated that only 2% of children under 8 years old in the United States own a cellular telephone or smartphone device.

In keeping with the foregoing observations, to provide consumers with user-friendly communication devices without some of the drawbacks of conventional mobile communication devices such as cellphones, embodiments of the present invention are described in which systems, methods and apparatuses facilitate the exchange of voice messages with and tracking user locations of special-purpose mobile communication devices.

The description of the embodiments may include material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Muchi Corporation 2016.

In one embodiment, exchanging voice messages with and relaying tracked locations of special-purpose communication device is performed over a packet switched network operated by a wireless communications carrier, such as a Narrowband LTE for IoT network.

In one embodiment, the special-purpose mobile communication device offers at least two features of a conventional cellphone, without the aforementioned undesirable effects, by limiting interaction to recording, playing, sending and receiving audio/voice messages. The special-purpose mobile communication device includes a speaker, a microphone, one button for activating communication, and indicators to alert/prompt the user when sending and receiving voice messages.

FIG. 1 is an architectural overview of a voice communication system and location tracking system 100 in accordance with embodiments of the invention. As shown, one or more special-purpose mobile communication devices 101*a*/101*b* having interfaces to one or more wireless broadband base stations 102*a*/102*b* transmit messages and/or location data to a cloud environment 104 messaging platform 106 and location tracking logic 108.

In one embodiment, a user of one of the special-purpose communication devices 101*a*/101*b* sends or receives voice messages over a packet-switched network operating over a wireless communication network. The messaging platform 106 stores messages as needed in accordance with the message information in the packets comprising the voice message. In one embodiment, the messaging platform 106 forwards the stored messages to their destination, such as user device 112. In one embodiment, the packet-switched network operating over the wireless communication network is a Narrowband LTE for IoT network operating over a wireless carrier network such as Verizon.

In one embodiment, the user device 112 is a general-purpose mobile communication device, such as a smartphone, in which the display area of the device is used by a mobile message app 110 to display a graphical user interface (GUI) to interact with one or more users of special-purpose communication devices as managed by the voice communication system 100. In operation the user device 112 is paired with one or more of the special-purpose mobile communication devices 101*a* during an earlier user registration sequence illustrated in further detail in the discussion for FIGS. 5A-5D. Once registered, a registered user's tracked location appears in the GUI of messaging app 110 and the app facilitates interacting with the registered users through the exchange of voice messages, including recording, sending, receiving and listening to voice messages.

Figure 2B:
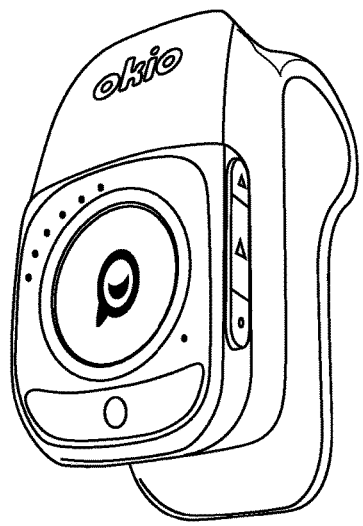

FIGS. 2A-2B illustrate two exemplary embodiments of a special-purpose mobile communication device that can be used in accordance with the voice communication and location tracking system 100 of FIG. 1. For example, in one embodiment, as illustrated in FIG. 2A, the special-purpose mobile communication device is a wristband that incorporates a speaker designed to be used to hear messages at low volume by bringing it close to the user's ear. It is intentionally not a loud speaker so as not to interrupt the user's activities, to add privacy and to reduce power consumption. The speaker can be activated using an activator that responds to pressing and holding to record and send voice messages or tapping to listen to received messages, or some other variation of touch-activated controlling as described in further detail below.

In one embodiment, the device in FIG. 2A includes a microphone configured to record messages that a user wishes to send to another user that has been pre-authorized to communicate with the device, such as a parent using the parent's mobile telephone device. The microphone can be activated through voice activation or using the aforementioned touch-activated activator.

In one embodiment, the touch-activated activator is a single activation mechanism is provided to manually control the message/communication functions. For example a button may be provided in which (1) a short press will playback the last received message, and (2) a press-and-hold will record a message.

In one embodiment, as shown in FIG. 2A, two indicators are provided to alert the user to the message status. For example, an outbound message indicator may be illuminated ON when recording a message and turned OFF when the message has been heard by the other user, such as the parent. An inbound message indicator may be illuminated ON when a message sent from the other user, such as the parent, is waiting to be heard, and turned OFF after the inbound message(s) have been played back.

As another example, in one embodiment, as illustrated in FIG. 2B, the special-purpose mobile communication device is a clip-style device that can be worn on a user's clothing. A clip-style device incorporates the same activation and indicator features described for the wristband in FIG. 2A. In one embodiment, the clip device can be clipped to a belt, backpack or carried in a pocket. While the clip device is worn, notifications of new messages can be conveyed to the user by any one or more of light signals (LED), haptic vibration and/or by changes to an electronic ink (e-ink) display located in a central easily-visible area of the clip device.

In one embodiment, an e-ink display can display the number of messages waiting to be received, the current time (e.g. in 5 minute increments), a confirmation when the clip user's messages have been received and listened to by a user of the mobile device 112, e.g. the parent, and a battery indicator.

In one embodiment, the device will include an "anti-loss" function in which the device can only receive and send messages when it is attached or held in a user's hands. When the device is not being worn, the e-ink display is limited to displaying identifying information, such as a nametag and cannot be activated. When operating in that mode, a mobile device 112 user, such as a parent, can use the mobile application 110 to command a registered/paired clip device to sound an alert to help locate the device.

In one embodiment, in other respects, the clip device functions can mirror the functions described with reference to the wristband embodiment of the special-purpose voice communication device 101/300 in FIG. 2A and elsewhere, including such features as sending and receiving voice messages, presenting visual indication when messages are received, such as a light indication or electronic ink display, displaying a number of messages awaiting to be played back, displaying a current time, displaying a QR-code for activation, displaying an identifier, such as a name tag, triggering haptic notifications when voice messages are received, triggering audible notifications when urgent voice messages are received, and detecting a low-battery condition.

Figure 3:
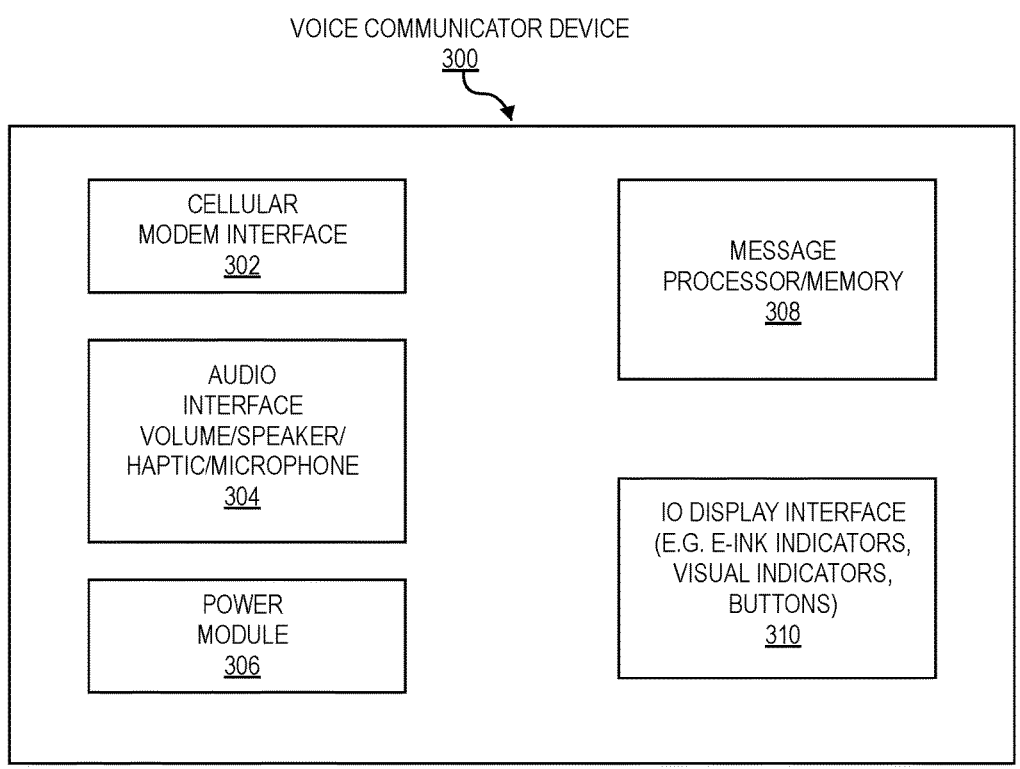
FIG. 3 is a block diagram illustrating exemplary components of a voice communicator device that may operate as a special-purpose mobile communication device for use with a mobile communication and location tracking system as described in FIG. 1.
Figure 5A:
FIGS. 5A-5D are illustrations of exemplary user interfaces for registering a special-purpose mobile communication device with a mobile communication and location tracking system as described in FIG. 1.
Figure 5B:
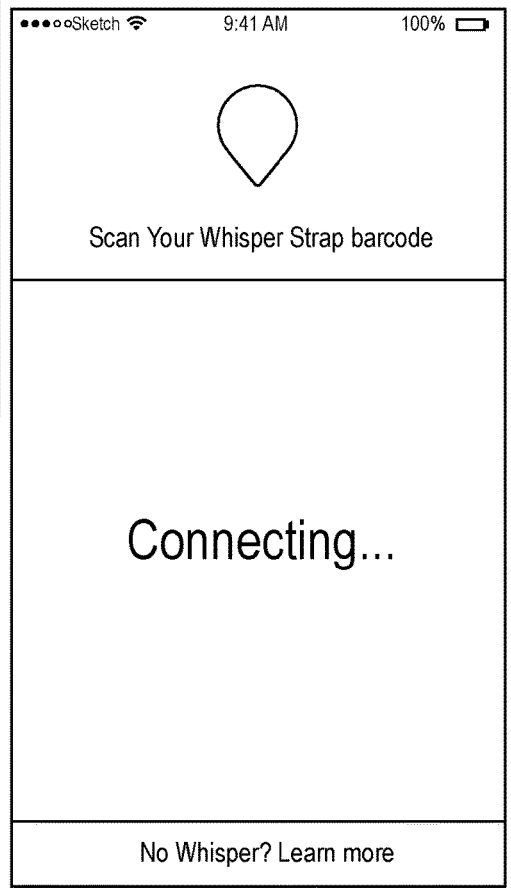
Figure 5C:
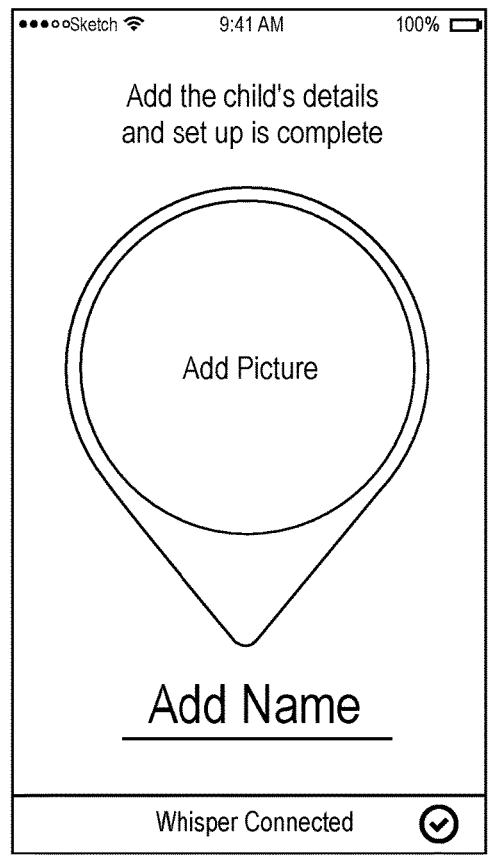
Figure 5D:
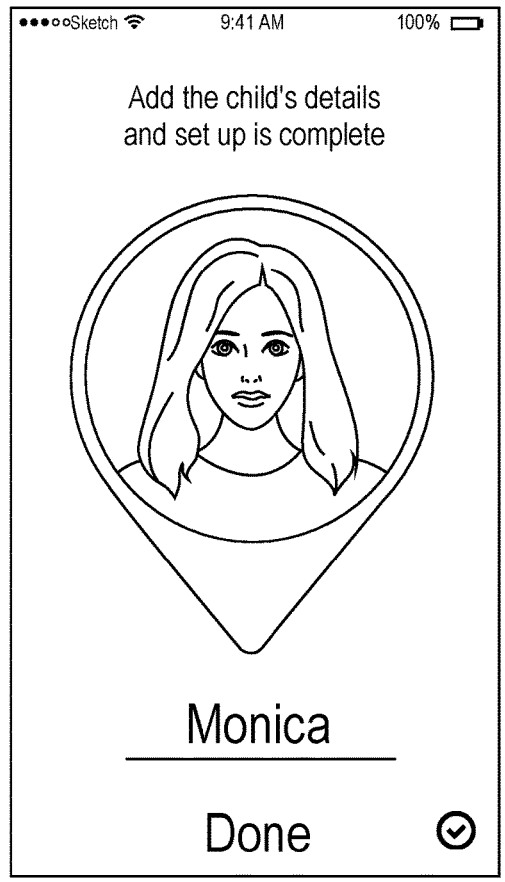

FIG. 3 is a block diagram illustrating exemplary components of a voice communicator device 300 that may operate as a special-purpose mobile communication device, such as the ones illustrated in FIGS. 2A-2B, for use with a mobile communication and location tracking system as described in FIG. 1. As shown, a voice communicator device 300 is equipped with a cellular modem interface 302, an audio interface 304, including a volume controller, a speaker controller, a haptic (vibration) controller and a microphone for recording voice messages. The device 300 is further equipped with an Input/Output display interface, such as an electronic-ink display or other visual indicators and/or touch-activated interfaces, such as a button or other activator. The device 300 is further equipped with a message processor/memory to enable the user to record, send, receive and play voice messages in cooperation with the other components described herein.

In one embodiment, the voice communicator device 300, such as the special-purpose mobile communications devices illustrated in FIGS. 2A-2B, communicate with a backend cloud-server (104, FIG. 1) accessible over a mobile communications network via base stations (102, FIG. 1). FIG. 4 illustrates an exemplary messaging platform and location tracker deployed on the backend cloud-server (104, FIG. 1) in which messages are stored and forwarded to facilitate the exchange of voice messages between users of the special-purpose mobile communications devices and the mobile device 112 with which they are registered.

As illustrated in FIG. 4, a voice communicator device 101/300 communicates, via base station 102, with the messaging platform and location tracker 400. In one embodiment, the messaging platform and location tracker 400 includes a messaging platform for receiving voice messages 402, storing voice messages 406 and forwarding voice messages 408 to facilitate exchanging messages between the device 101/300 and a message/tracking app 110 on mobile device 112 in real-time or near real-time.

In one embodiment, the mobile communication device 112, such as the parent's cellphone, is configured not only to exchange the voice messages with the user of the special-purpose mobile communications device, 101/300 but also to obtain or receive base station measurement data 404 that is used by a location tracker 108, also referred to as a multi-lateration component, to determine the location of the special-purpose mobile communications device. In one embodiment, the base station measurement data includes data such as the Observed Time Difference of Arrival measurements from multiple base stations 102 of the network over which the devices communicate, as per 3GPP Standard revision 9.

For example, in one embodiment, the exchange of messages is performed in conjunction with a communication network such as Narrowband LTE for IoT to optimize the efficiency and reduce the latency of the voice messages. In one embodiment, the network is any cellular wireless network using LTE for both location and messaging, as opposed to the conventional use of GPS, to extend battery life and allow for a smaller size for the special-purpose mobile communications device 101/300, such as a smaller wristband size or smaller clip size (FIG. 2A-2B), and to lower unit costs of production of the special-purpose mobile communications device 101/300. As an added advantage, using LTE-based location also works indoors.

With reference to the figures that follow in FIGS. 5A-5D illustrate exemplary screenshots of a GUI on mobile communication device 112 as controlled by mobile app 110, in which a special-purpose mobile communications device is registered, or paired, with a mobile communication device to enable the devices to exchange voice messages according to one embodiment of the invention.

As illustrated, in a typical embodiment, a user of mobile communication device 112, such as a parent, launches an application to take a picture of a QR-Code (or barcode) printed at the back of a child's special-purpose mobile communications device 101/300. The captured QR-Code (or barcode) triggers registration of the special-purpose mobile communications device 101/300 with a backend system, e.g. cloud server 104 and messaging platform and location tracker 400, and associates the child's device 101/300 with the application on the parent's mobile communication device 112.

In one embodiment, as illustrated, the parent may add additional details as desired such as the child's name and their picture. This information can be used to customize the location monitoring and message exchange features of the system as it appears in the mobile application 110 GUI.

In one embodiment the registration procedure is as follows: each special-purpose mobile communications device has a QR-code printed in the back of it. After a parent purchases the special-purpose mobile communications device, he/she (1) downloads the parent mobile communication device voice chat and location app, (2) on app launch he/she is prompted to take a picture of the QR code and (3) is asked to enter contact information, such as e-mail or cellphone number. In this manner the app establishes a private family network and registers the special-purpose mobile communications device and the parent's mobile communication device/app with the private family network. If later someone else (e.g. the father) repeats the process, the first parent is asked (via the app) to authorize him into the private family network. If she does, both parents will be able to communicate with the child using the special-purpose mobile communications device/mobile communication device app and vice-versa.

In view of the foregoing, in one embodiment, the special-purpose mobile communications device(s) 101/300 and mobile communication device(s) 112 and associated messaging platform and location tracker 400 with which the special-purpose mobile communications device is registered, taken together, form a private family network between parents and their children. Children can send messages to any of the registered guardians (parents) using the special-purpose mobile communications device. Likewise, registered guardians (parents) can send messages to their children or other guardians (and monitor the locations of same) using the app installed on their mobile communication device.

In one embodiment, voice messages are transmitted between users via the messaging platform 400 using half-duplex voice messages (aka. voice chats) instead of regular duplex phone call messages. Using half-duplex voice messages has a number of advantages including:

a. Allows a very low volume speaker (soft-speaker) to deliver messages that the special-purpose mobile communications device user hears by putting the device against her ear. A soft-speaker is much more energy efficient and will not add noise to the user's environment (e.g. a classroom).

b. Allows the radio transmitter to be turned off during recording and playback, ensuring that all RF transmissions take place when the special-purpose mobile communications device user has the wristband away from her head.

c. Allows the use of a very aggressive power saving strategy, with long sleep cycles to achieve very long battery life.

d. Allows the purchase of data plans from the mobile network operator at machine-to-machine pricing, instead of real-time voice, resulting in a much lower product cost.

e. Allows not only delivery confirmation of messages but also "listened" confirmation: the special-purpose mobile communications device user knows that one of the mobile communication device users with whom she is registered (e.g. her parents) has listened to her message when the indicator turns off/changes color, or otherwise indicates same.

f. Allows determination of whether the special-purpose mobile communications device is actually being worn (e.g. is on the user's wrist) and notifies the mobile communication device user (e.g., the parent) if it is not. This function is performed using a combination of monitoring a clasp provided on the special-purpose mobile communications device as well as monitoring an accelerometer on the device (e.g. to detect motion).

g. Allows more efficient compression of voice by making use of file compression algorithms instead of the stream compression methods used for real-time audio.

Figure 6A:
FIGS. 6A-6B are illustrations of an exemplary user interface for displaying and tracking locations of users of special-purpose mobile communication devices relative to other mobile communication device users of a mobile communication and location tracking system as described in FIG. 1.
Figure 6B:
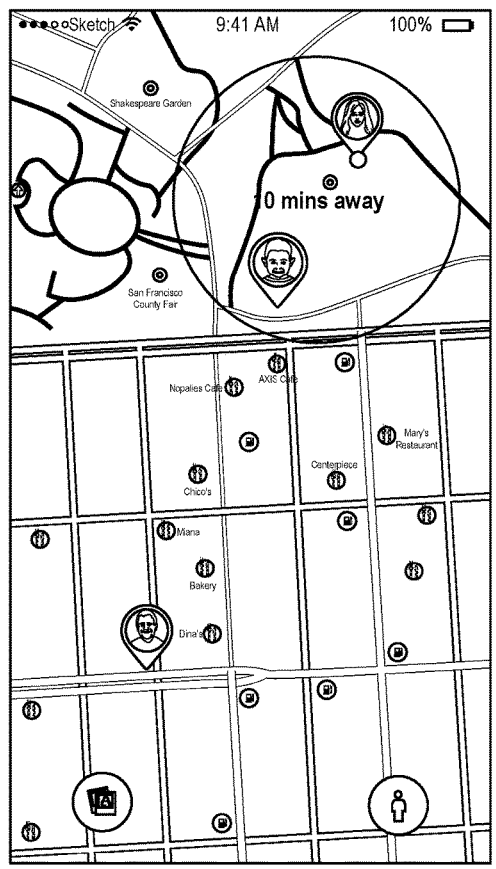

FIGS. 6A-6B illustrate an exemplary user interface in a mobile communication device 112 for monitoring location information of the special-purpose mobile communications device(s) 101/300 relative to other mobile communication device users, including the mobile communication device 112 used to register the special-purpose mobile communications device as illustrated in FIGS. 5A-5D, and in accordance with one embodiment of the invention. As shown, the registered special-purpose mobile communications device can be located and shown in a displayable map interface that can be zoomed in or out to show additional users/geographic areas.

Each of the remaining FIGS. 7A-7B through FIGS. 14A-14B are illustrations of an embodiment of a special-purpose mobile communication device 101/300 on the left, and an exemplary user interface of a mobile application 110 of a general-purpose communication device 112 on the right, each set of figures illustrating a sequence of changes in the appearance of one embodiment of a special-purpose mobile communications device 101/300, such as the wristband illustrated in FIG. 2A, and the corresponding registered mobile communication device 112 app user interface 110 when exchanging messages with and monitoring the location of the special-purpose mobile communications device.

Figure 7B:
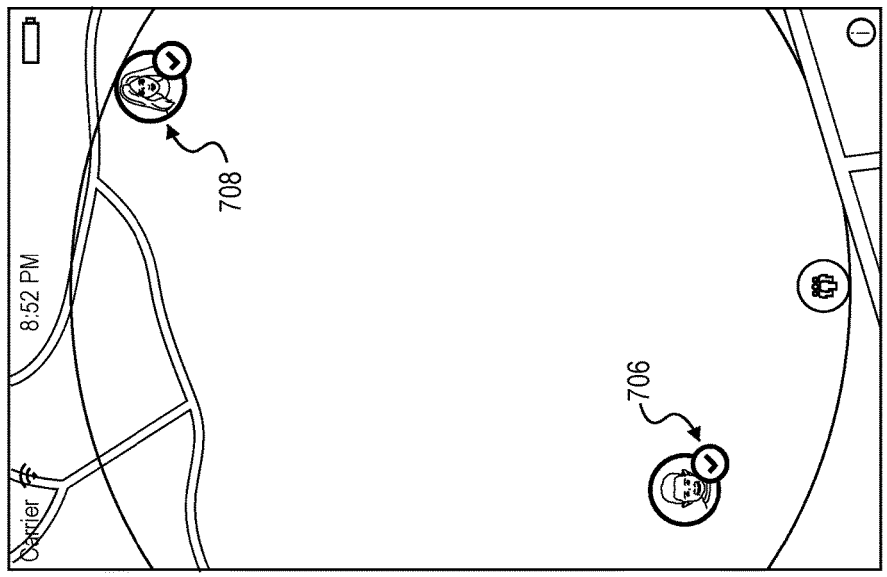
FIGS. 7A-7B, 8A-8B, 9A-9B, 10A-10B, 11A-11B, 12A-12B, 13A-13B and 14A-14B are eight sets of figures illustrating exemplary embodiments of a special-purpose mobile communication device on the left, and a corresponding exemplary user interface of a mobile application of a general-purpose communication device on the right, for use in a mobile communication and location tracking system as described in FIG. 1.
Figure 7A:
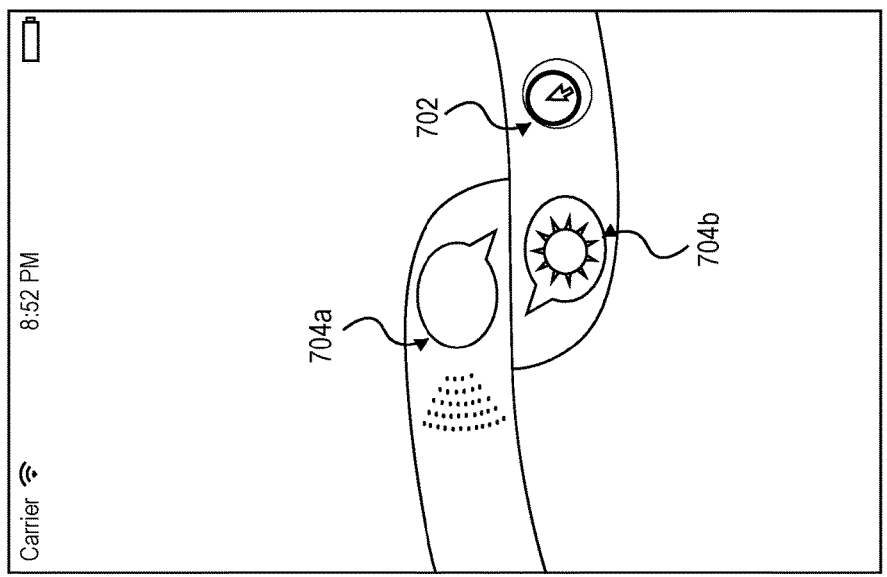
Figure 8B:
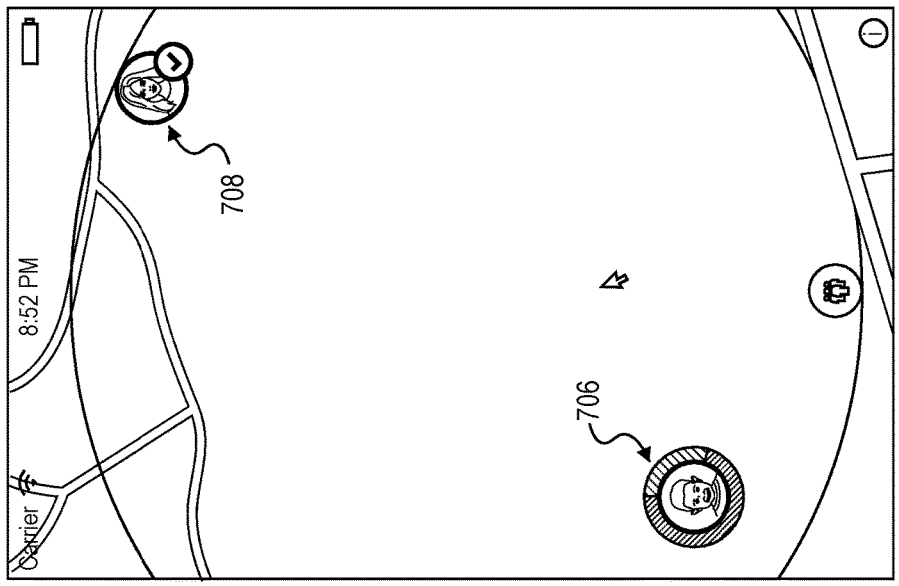
Figure 8A:
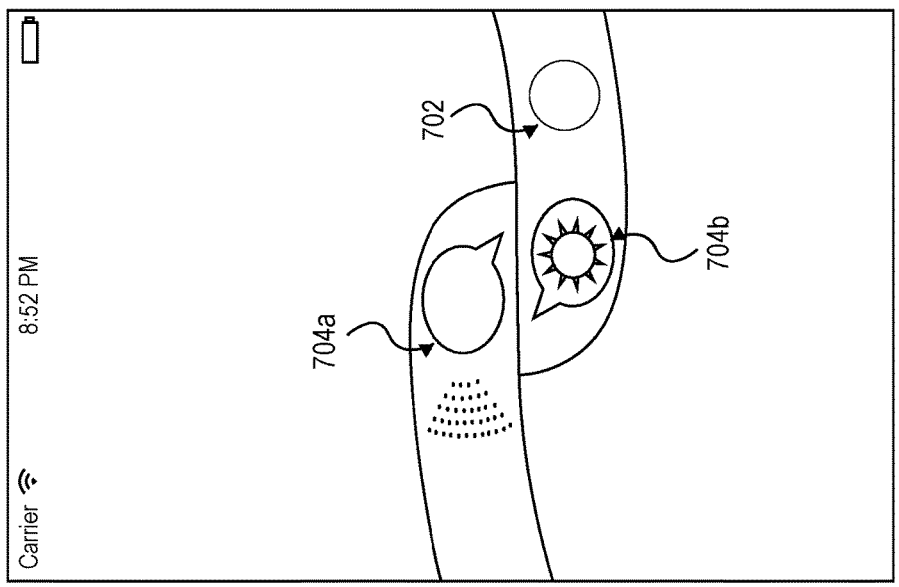
Figure 9B:
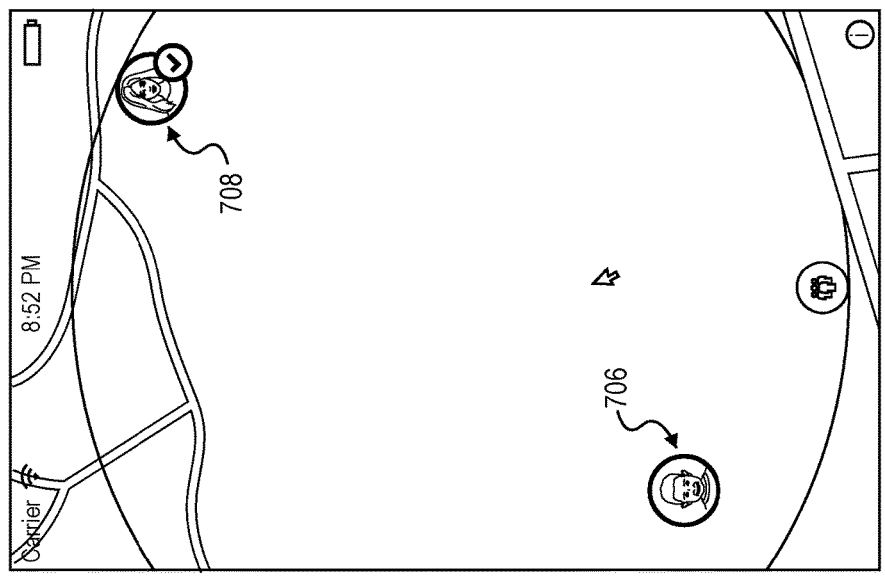
Figure 9A:
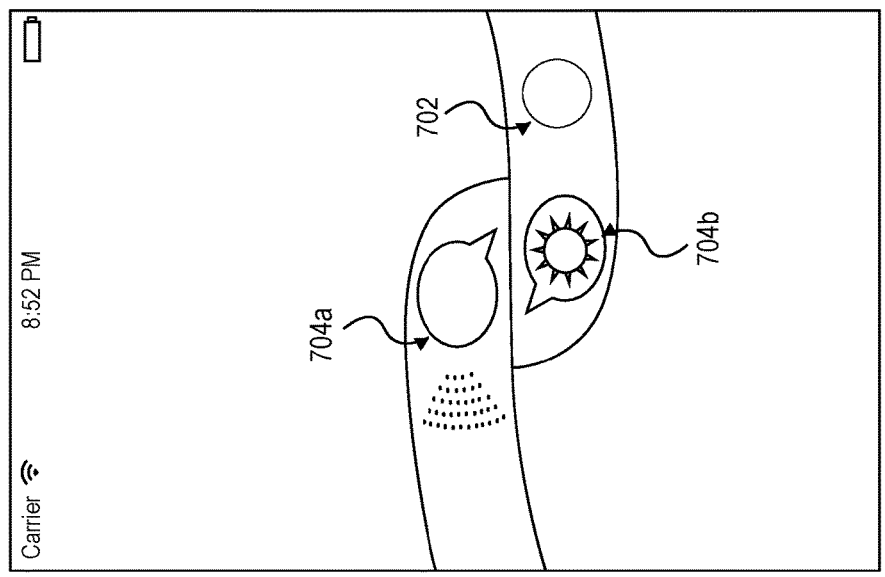
Figure 10B:
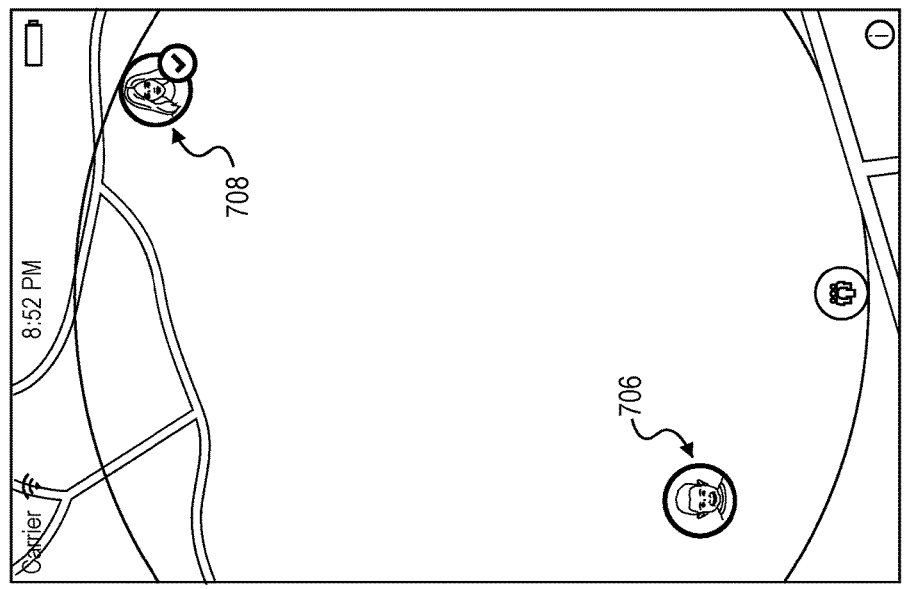
Figure 10A:
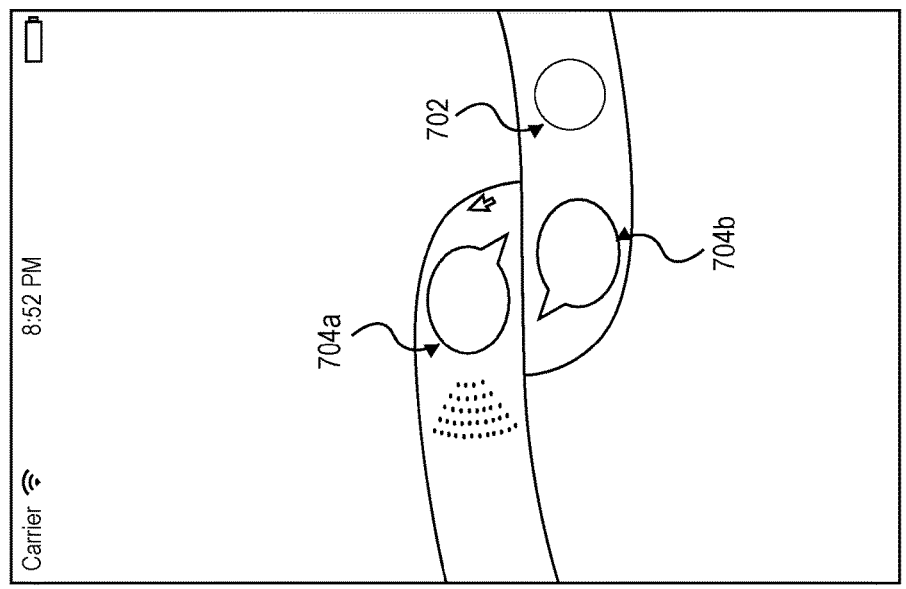

For example, FIGS. 7A-7B illustrates the appearance of the special-purpose mobile communications device 101/300 indicators 704a/704b, activator 702 and corresponding map icons 706/708 for each of the users as displayed on the general purpose communication device 112 when the child activates, via activator 702, the special-purpose mobile communications device to record a message. FIGS. 8A-8B illustrate the parent 706 icon lighting up representing that a child user 708 has sent a message to the parent, and the corresponding illumination of indicator 704b on the child's device 101/300 indicating that the child's voice message to the parent has been sent. FIGS. 9A-9B illustrate the parent 706 icon turning off representing confirmation that the child's message has been received and played by the parent, and FIGS. 10A-10B illustrate the child's device 101/300 message indicator turning off, thereby alerting the child that the parent has listened to their message.

Figure 11B:
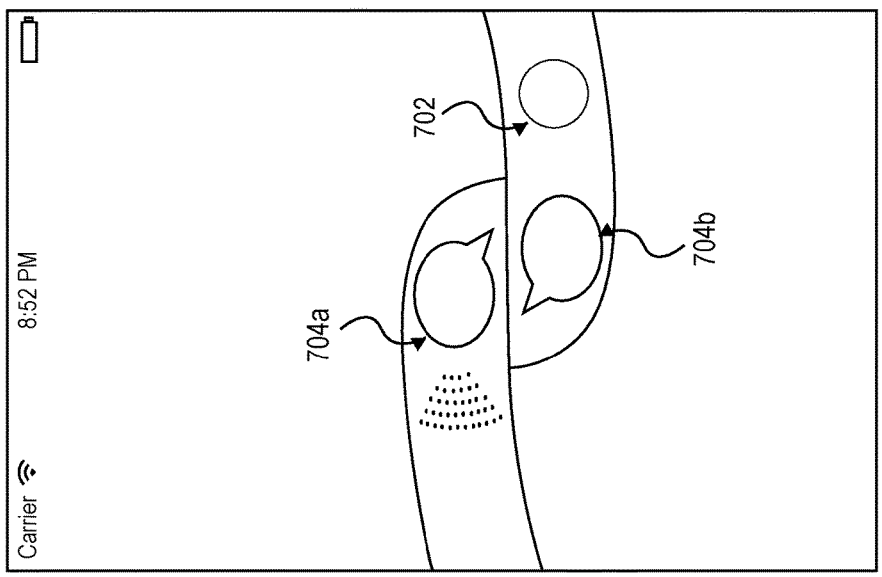
Figure 11A:
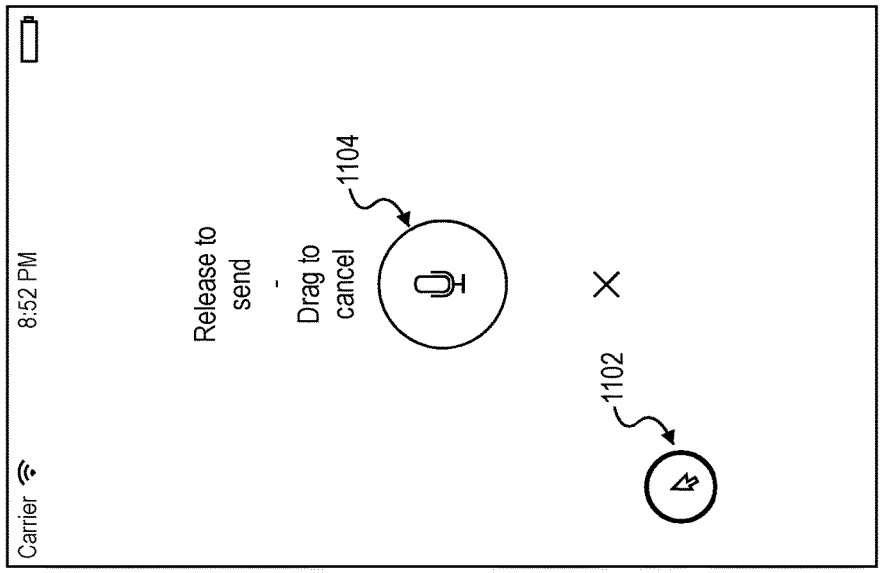
Figure 12B:
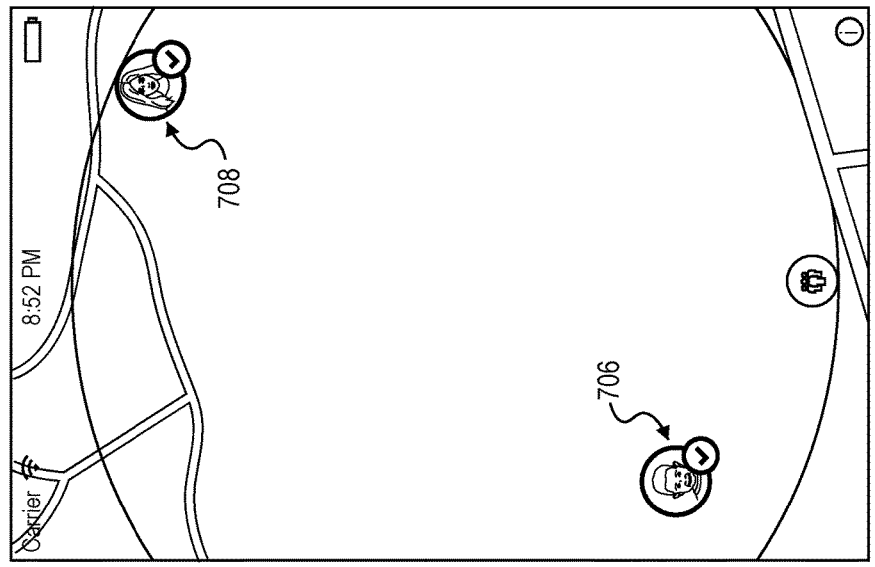
Figure 12A:
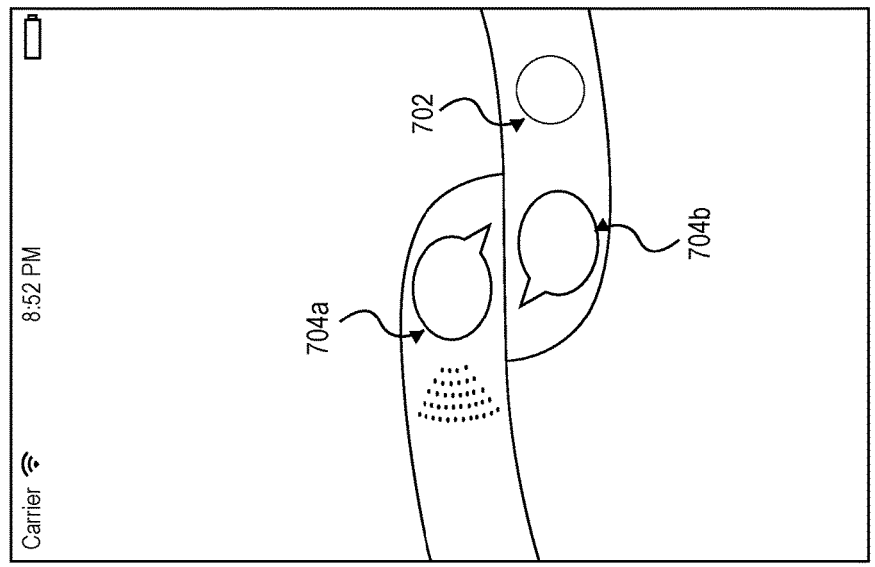
Figure 13B:
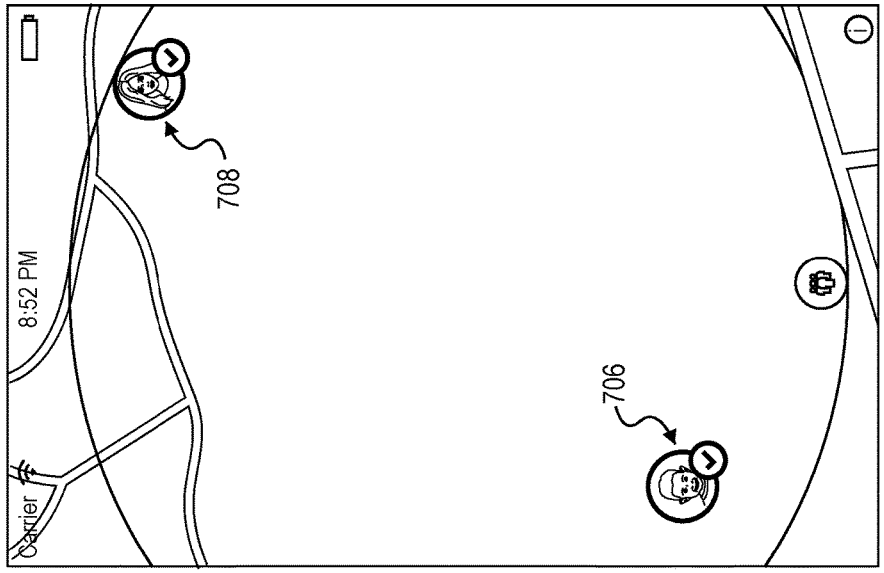
Figure 13A:
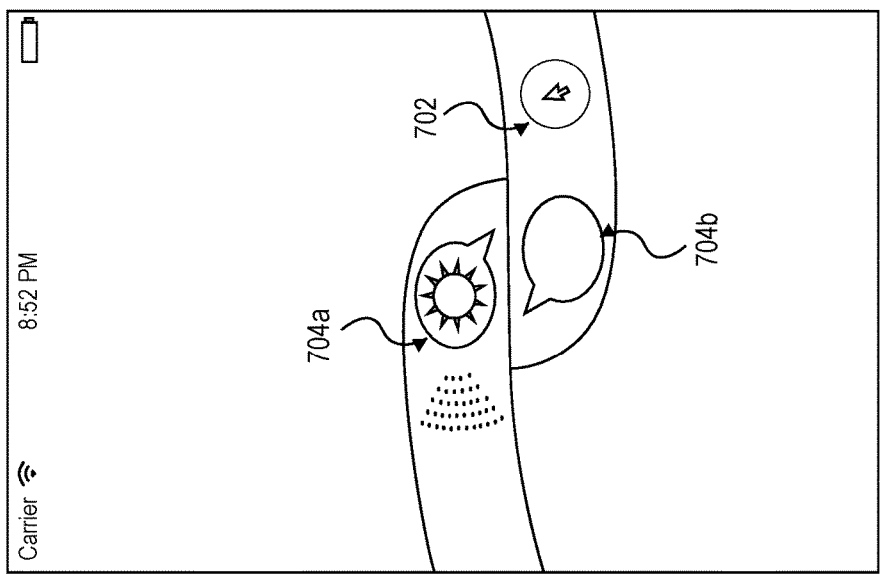

In one embodiment, FIGS. FIGS. 11A-11B through 14A-14B illustrate the messaging process in reverse, i.e. the parent sending a message to the child via the user interface of the message app 110 on device 112. As shown in FIG. 11A-11B, first the parent records a message, e.g., responding to the earlier child's message. Upon release of the recording interface, as shown in FIG. 12A-12B, the parents icon 706 displays a message send indicator such as the up arrow indicator on the parent icon, and in FIGS. 13A-13B illustrates the corresponding illumination of the received message indicator 704a on the child's device upon receipt of the message. In one embodiment, the use of the up arrow on the parent icon 706 indicates that a message has been recorded and is being transmitted to the other user, e.g. the child user represented by user icon 708.

Figure 14B:
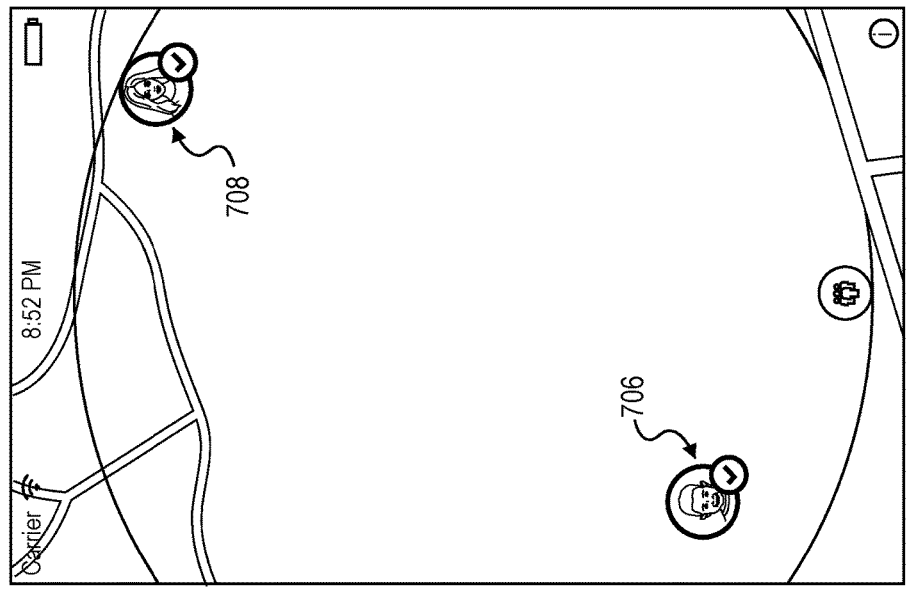
Figure 14A:
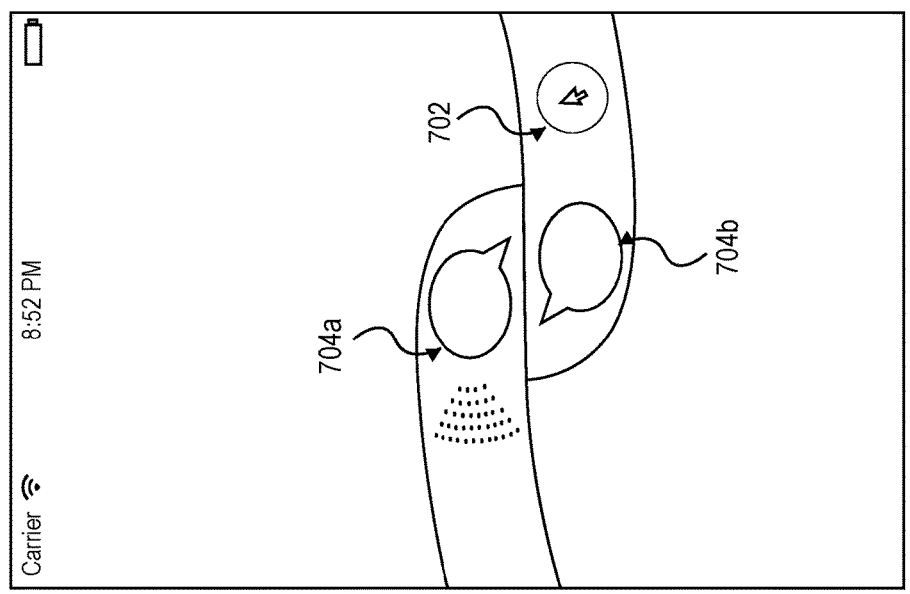

FIGS. 14A-14B illustrate the appearance of the user interface when the child taps on the activator 702 of their device 101/300 to hear the parent's response message, upon which the received message indicator 704 turns off, and the corresponding message sending indicator (the arrow) on the parent icon 706 turns into a checkmark indicator to alert the parent that the child has received and listened to the parent's response message.

In one embodiment the icons on the user interface of the mobile communication device 112 and mobile app 110 are interactive to initiate recording/playback of messages and/or other user functions.

FIGS. 15A-15D illustrate the appearance of an alternative embodiment of a special-purpose mobile communication device 101/300, such as the clip device first illustrated in FIG. 2B. In the illustrated use of the clip device, the user, such as a child, activates the device using an activator 1502 to begin recording and then sending a message. As the message is recorded, the progress of the recording is illustrated in FIGS. 15B-15D, and upon release of the activator 1502 the voice message just recorded is sent to a corresponding user device that was previously paired/registered with the child's clip device.

Figure 16:
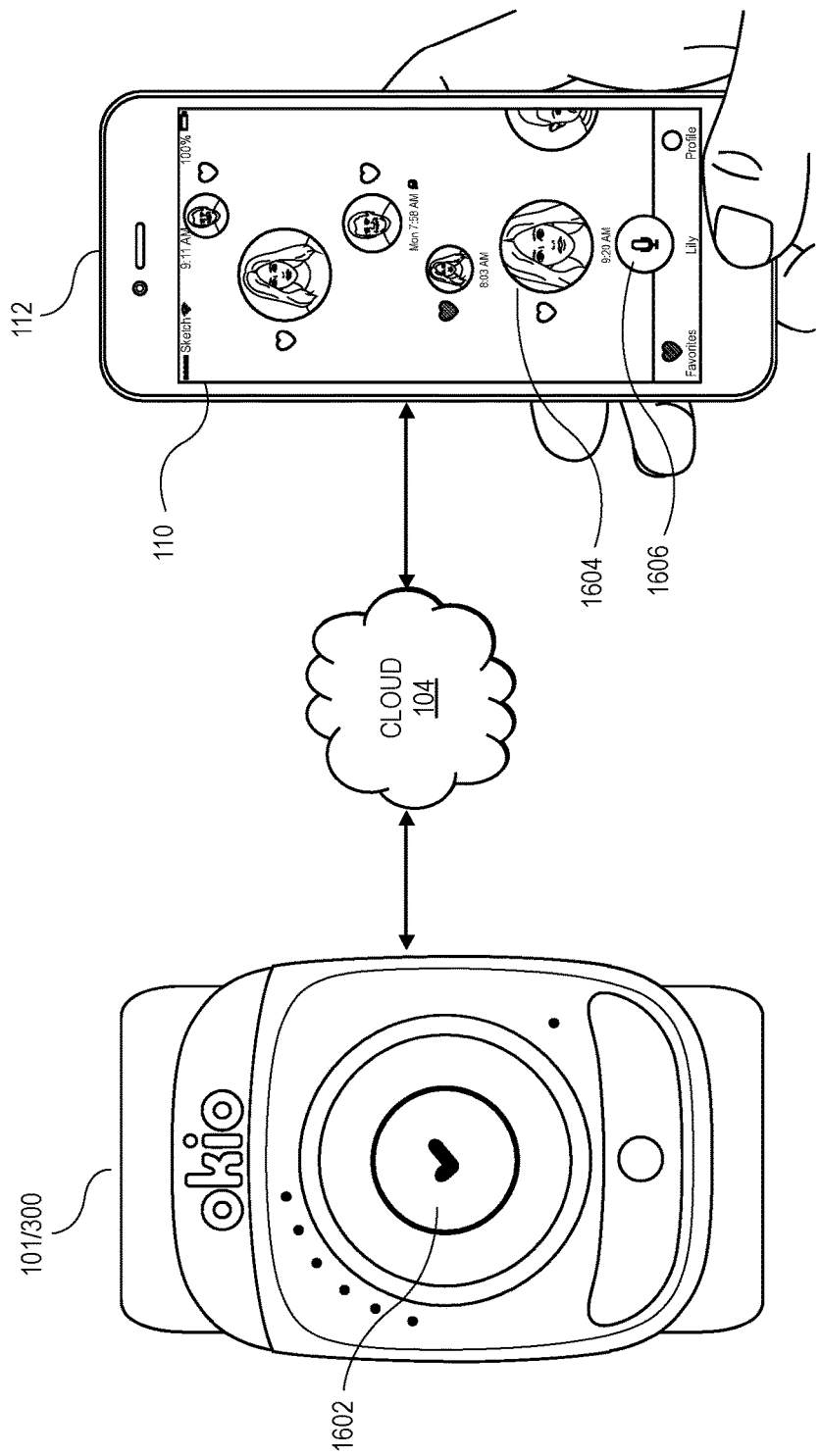
FIG. 16 is a set of figures illustrating the alternative exemplary embodiment of an alternate special-purpose mobile communication device on the left, and a corresponding exemplary user interface of a mobile application of a general-purpose communication device on the right, for use in a mobile communication and location tracking system as described in FIG. 1.

As illustrated in FIG. 16, the confirmation that the voice message was sent to mobile device 112 is displayed on device 101/300 with a check mark in the center of the indicator display 1602 of device 101/300. As illustrated in FIG. 16, a confirmation that the voice message has been received in device 112 is shown by illuminating or otherwise highlighting the child icon 1604 corresponding to the child that sent the voice message using device 101/300. The parent user of mobile device 112 can then activate the microphone icon 1606 on the mobile app 110 user interface to record and send a response message similar to the illustration in FIG. 11B and description that follows of the subsequent sending, receiving and playing of the response message.

Figure 17B:
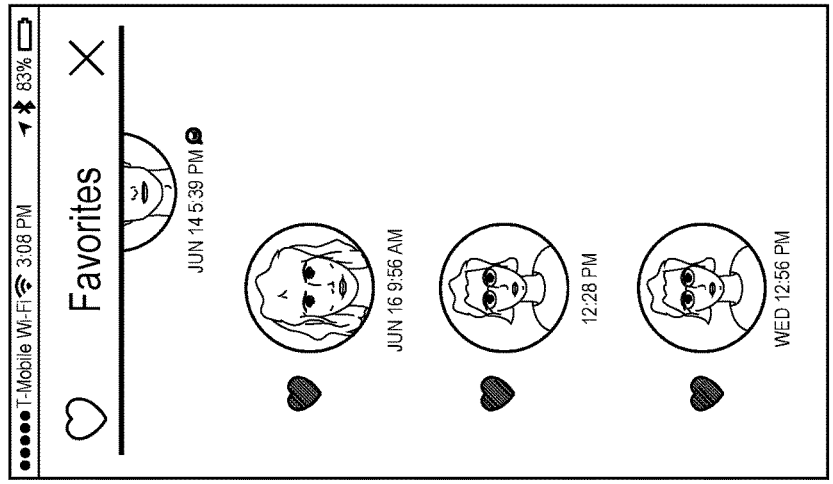
FIGS. 17A-17B illustrating an exemplary user interface of a mobile application of a general-purpose communication device for use in a mobile communication and location tracking system as described in FIG. 1.
Figure 17A:
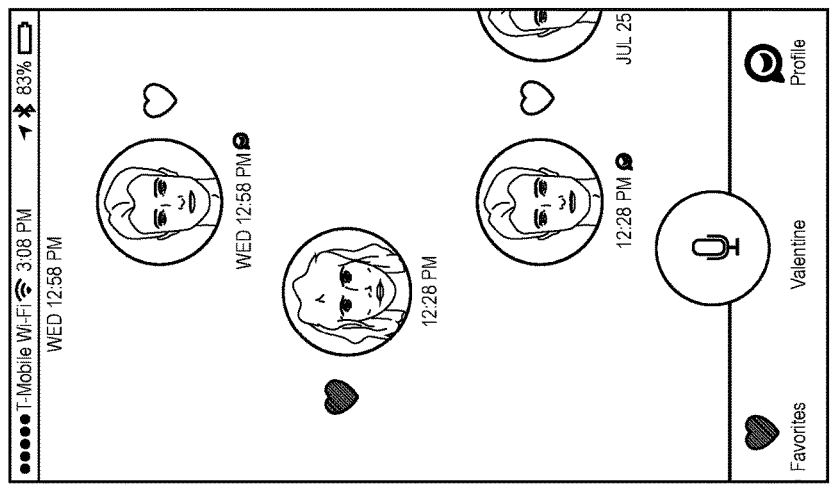

As illustrated in FIGS. 17A-17B, the message app 110 operating on mobile device 112 presents the user with a scrapbook feature that enables the user to scroll through a list of voice messages as represented by the message icon for the user that sent or received the voice message and the associated time stamp of the message, and to flag which messages the user would like to save as a favorite voice message. As illustrated in FIG. 17B, the flagged voice messages can then be separately viewed in a scrapbook "Favorites" interface that allows the user to play back past voice messages, and caption them or forward them to other users, or otherwise manipulate or make use of the favorite voice messages. In one embodiment, the favorite voice messages can be stored locally on the user's device and/or stored as a link to the voice message stored in a cloud server such as the mobile messaging platform 106 of the voice communication and location tracking system 100 as illustrated in FIG. 1.

Figure 18:
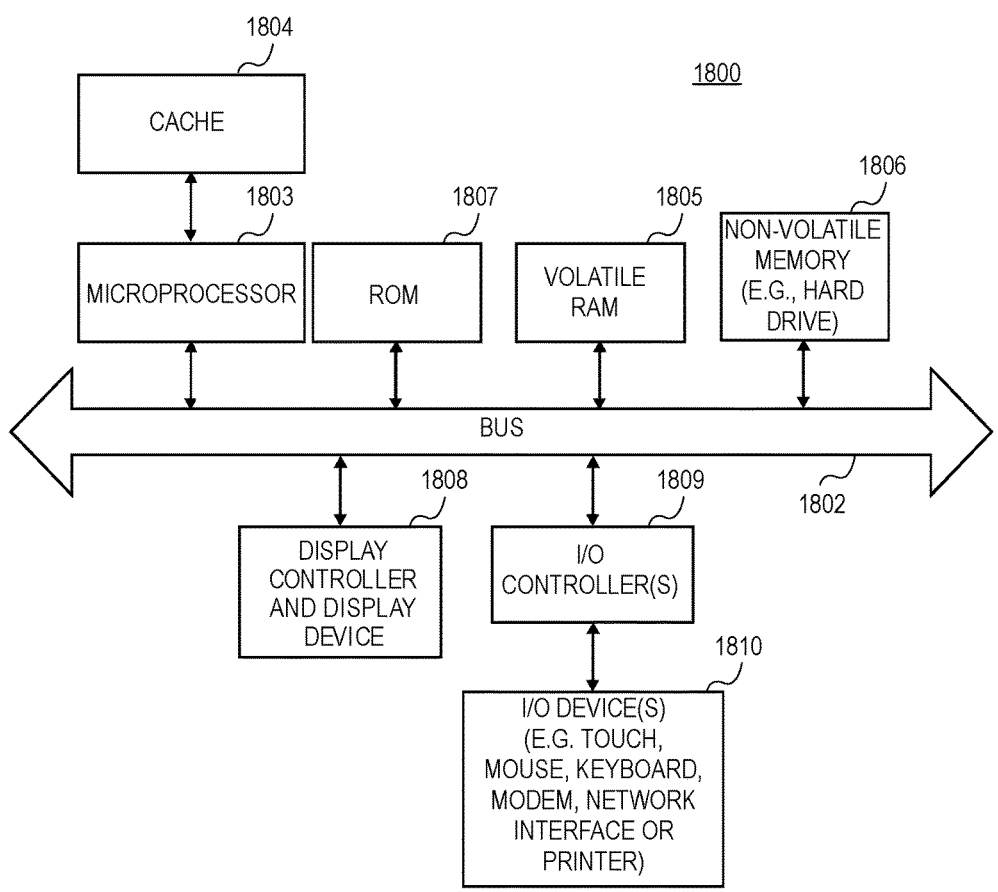
FIG. 18 is a block diagram overview of a computer system or device, which may be used with an embodiment of the invention.

FIG. 18 is a block diagram overview of a computer system 1800, or device, which may be used with one embodiment of the invention. For example, the system 1800 may be used as a the mobile computing device 112 operating the messaging app 110 as shown in FIG. 1, or may be used as a server to support the messaging platform 106 and/or location tracking services 108 as shown in FIG. 1.

Note that while FIG. 18 illustrates various components of a computer system or device, it is not intended to represent any particular architecture or manner of interconnecting the components; as such details are not germane to the present invention. It will also be appreciated that network computers, various types of user devices, including hand-held computers, mobile devices, cell phones, tablets and other data processing systems, any of which may have fewer components or perhaps more components than illustrated in FIG. 18, may also be used with embodiments of the present invention.

As shown in FIG. 18, the computer system 1800, which is a type of a data processing system, includes a bus or interconnect 1802, which is coupled to one or more microprocessors 1803 and a ROM 1807, a volatile RAM 1805, and a non-volatile memory 1806. The microprocessor 1803 is coupled to cache memory 1804. The bus 1802 interconnects these various components together and also interconnects these components 1803, 1807, 1805, and 1806 to a display controller and display device 1808, as well as to input/output (I/O) devices 1810, which may be mice, keyboards, modems, network interfaces, printers, and other devices, which are well known in the art.

Typically, the input/output devices 1810 are coupled to the system through input/output controllers 1809. The volatile RAM 1805 is typically implemented as dynamic RAM (DRAM) that requires power continuously in order to refresh or maintain the data in the memory. The non-volatile memory 1806 is typically a magnetic hard drive, a magnetic optical drive, an optical drive, or a DVD RAM or other type of memory system that maintains data even after power is removed from the system. Typically, the non-volatile memory will also be a random access memory, although this is not required.

While FIG. 18 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1802 may include one or more buses connected to each other through various bridges, controllers, and/or adapters, as is well known in the art. In one embodiment, the I/O controller 1809 includes a USB (Universal Serial Bus) adapter for controlling USB peripherals. Alternatively, I/O controller 1809 may include an IEEE-1394 adapter, also known as FireWire adapter, for controlling FireWire devices.

Embodiments of the invention also relate to an apparatus for performing the operations herein, such as a computer program that is stored in a non-transitory computer or machine-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A mobile voice communication apparatus comprising:
   a first mobile device configured with a low-bandwidth cellular interface to a packet switched network, wherein the low-bandwidth cellular interface to the packet switched network is a Narrowband Long-Term Evolution (LTE) for Internet of Things (IoT) interface, the mobile device capable of recording and playing short voice messages, the mobile device having a processor configured to:

authorize the mobile device to communicate with a second device responsive to a registration request initiated by the second device;

compress a short voice message using a file compression algorithm;

transmit the compressed short voice message to the second device;

receive a confirmation that the short voice message was received and played by the second device;

display the confirmation using an indicator on the mobile device.

2. The apparatus of claim 1, further comprising:
the mobile device processor configured to:
receive a short voice message from the second device with which communication is authorized;
decompress the received short voice message using the file compression algorithm; and
cause the decompressed short voice message to be played on the device responsive to activation of an activator on the device; and
transmit a confirmation to the second device that the received short voice messages was played.

3. The apparatus of claim 1, further comprising:
the mobile device processor configured to report a location measurement data of the mobile device to the packet switched network, the location measurement data enabling a location of the mobile device to be tracked by the second device.

4. The apparatus of claim 1, further comprising:
the mobile device configured with at least one indicator to indicate to a user of the mobile device the confirmation that the short voice message was or was not received and played by the second mobile device.

5. The apparatus of claim 4, wherein the at least one indicator is any one of a visual, aural and tactile indicator.

6. The apparatus of claim 5, wherein the at least one indicator includes an outgoing message indicator distinguishable from an incoming message indicator.

7. The apparatus of claim 1, wherein the short voice messages have a duration limit that enables the mobile device and the second device to transmit and receive short voice messages in any one of real-time and near real-time.

8. A mobile voice communication apparatus comprising:
a mobile device configured with a low-bandwidth cellular interface to a packet switched network, wherein the low-bandwidth cellular interface to the packet switched network is a Narrowband Long-Term Evolution (LTE) for Internet of Things (IoT) interface, the mobile device capable of recording and playing short voice messages, the mobile device having a processor configured to:

authorize the mobile device to communicate with a second device responsive to a registration request initiated by the second device;

compress a short voice message using a file compression algorithm;

transmit the compressed short voice message to the second device;

receive a confirmation that the short voice message was received and played by the second device;

display the confirmation using an indicator on the mobile device, and wherein the mobile device processor is configured to report a location measurement data of the mobile device to the packet switched network, the location measurement data enabling a location of the mobile device to be tracked by the second device and is configured with at least one indicator to indicate to a user of the mobile device the confirmation that the short voice message was or was not received and played by the second mobile device.

9. The apparatus of claim 8, further comprising:
the mobile device processor configured to:
receive a short voice message from the second device with which communication is authorized;
decompress the received short voice message using the file compression algorithm; and
cause the decompressed short voice message to be played on the device responsive to activation of an activator on the device; and
transmit a confirmation to the second device that the received short voice messages was played.

10. The apparatus of claim 8, wherein the at least one indicator is any one of a visual, aural and tactile indicator.

11. The apparatus of claim 10, wherein the at least one indicator includes an outgoing message indicator distinguishable from an incoming message indicator.

12. The apparatus of claim 8, wherein the short voice messages have a duration limit that enables the mobile device and the second device to transmit and receive short voice messages in any one of real-time and near real-time.

* * * * *